Jan. 30, 1962  C. P. SPAULDING ETAL  3,019,427
SHAFT POSITION ENCODER
Filed Dec. 1, 1958

INVENTORS.
CARL P. SPAULDING
WILLIAM S. DUNCAN
BY
Christie, Parker & Hale

United States Patent Office 3,019,427
Patented Jan. 30, 1962

3,019,427
SHAFT POSITION ENCODER
Carl P. Spaulding, San Marino, and William S. Duncan, Altadena, Calif., assignors to Datex Corporation, Monrovia, Calif., a corporation of California
Filed Dec. 1, 1958, Ser. No. 777,404
7 Claims. (Cl. 340—347)

This invention relates to encoders or analog-to-digital converters and the like and more particularly to encoders having adjustable brush assemblies.

Continuously variable quantities or analog information may be represented in terms of the positions of a rotating shaft. These shaft positions can be converted to discrete numerical form or digital information by means of a coded disc rotatable with the rotating input shaft. The disc may be arranged with a plurality of radially spaced tracks having coded conductive and non-conductive segments thereon to provide, for example, 1000 bits of information. These bits of information are derived from the disc by means of a sensing element arranged to slidably engage the coded segments of a track on the disc and to provide a discrete electrical signal or impulse upon sensing each conductive segment. The accuracy of the converter or encoder will be seen to be dependent upon the alignment of the sensing elements with the coded segments of each track.

Various sensing element arrangements or brush assemblies have been devised to cooperate with the coded discs for these encoders. Each one of these arrangements must accurately and precisely position the disc sensing elements to their required tolerances for satisfactory operation or else provide some means to adjust the sensing element once positioned in the encoder. Some of these adjustable arrangements include a cantilever spring having an adjusting screw to control the vertical position of the spring and thereby the associated sensing element. In order to avoid the shock and vibration difficulties found to exist in the cantilever spring arrangement, a brush assembly utilizing a U-shaped member positioned to be slidable in two vertical grooves arranged in a mounting member therefor has been used. The position of the U-shaped member was adjusted by means of a differential screw, to precisely locate the U-shaped member relative to the coded segments on the disc. This latter type of brush arrangement has proved to be satisfactory but rather bulky.

This invention provides an improved and inexpensive and more compact brush adjusting assembly for use with encoders or analog-to-digital converters. The improved adjustable brush assembly comprises a mounting member which may be an insulative member provided with a plurality of spaced apart sockets having a spacing corresponding to the radial spacing of the tracks for the associated coded disc. The sockets for the mounting member are further defined to each slidably receive a conductive brush holder. The brush holder is preferably of a configuration to be non-rotatable in the socket, and which configuration may be square or rectangular, and further dimensioned to be held in the sockets of the mounting member without resorting to any securing means.

The brush holder itself is provided with an angular slot to receive a disc sensing element, which may be a thin, flat, conductive hoe-shaped element having a bifurcated end. The brush holder is also advantageously provided with an adjusting notch on the opposite side from the brush carrying side for allowing the brush to be vertically positioned in the sockets of the mounting member by means of cooperating access holes provided for the mounting member. The access holes are arranged and spaced opposite the adjusting apertures and are dimensioned to receive an adjusting tool insertable in the adjusting notch to change the vertical position of the brush holders. This brush assembly is correctly positioned and secured in the encoder with the brush in engagement with the correct track on the coded disc. The case or housing for the encoder is preferably provided with an access aperture arranged adjacent the brush assembly to allow access to the brush holders and a view of the coded segments of the disc so that the brushes may be adjusted to meet and leave the coded segments of the individual track correctly.

The encoder brush assembly embodying the invention provides a bearing surface for use of the adjusting tool and which bearing surface can be advantageously used to readily and easily adjust the position of the brush holders. This bearing surface may also be provided in accordance with another modification of this invention through the provision of a longitudinal cylindrical groove for the mounting member extending opposite to the series of adjusting notches for the brush holders. A cylindrical tool may then be inserted into this grooved portion and which tool should be provided with an eccentric point for engaging a notch of a brush holder in an adjusting relationship to thereby change the vertical position of the brush.

The encoder is further advantageously arranged with a casing of substantially closed cylindrical configuration and having an axial aperture to mount a rotatable shaft therein. The casing may have an aperture on one side thereof to allow access to the brush assembly and which brush assembly may be adjusted when the type of assembly is used having the above described longitudinal groove. The casing is further arranged with an access aperture arranged on one end face opposite the input shaft. This access aperture is preferably arranged in a substantially circular recessed portion and which portion is provided with a rotatable closure member. The closure member may be a flat cover plate for closing the arcuate aperture and secured so as to be rotatable in said recess.

These and other features of the present invention may be more fully appreciated when considered in the light of the following specification and drawings, in which.

Figure 1:
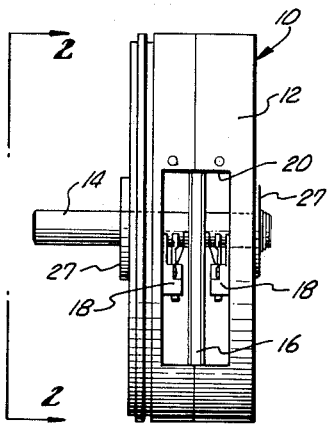
FIG. 1 is an elevational view of the encoder with the side cover removed and embodying the invention.

Now referring to the drawings, wherein an encoder 10 is illustrated comprising a casing or housing 12 mounting a rotatable input shaft 14 carrying a coded disc 16. An adjustable brush assembly 18 is mounted in the casing 12 for sensing the coded disc 16.

Figure 2:
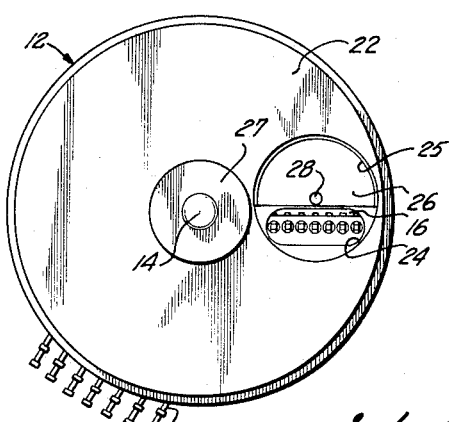
FIG. 2 is a side elevational view of the encoder of FIG. 1, taken along the line 2—2, with the closure member rotated to an open position.

The casing 12 comprises a substantially closed cylindrical member constructed of aluminum and having a side aperture 20 arranged thereon to allow the brush assembly 18 to be positioned in the casing 12. The casing 12 is shown in FIG. 1 with the closure member (not shown) for the aperture 20 removed. It will be appreciated that the casing 12 is normally provided with a closure member secured to the casing 12. The left hand end face 22, as illustrated in FIG. 2, for the casing 12 is shown with an access aperture 24. The aperture 24 is arranged on the end face 22 in a recessed portion 25 of substantially circular configuration. The access aperture 24 is arranged to allow access to the brush assembly 18 and a view of the disc 16 for adjusting purposes. When the encoder 10 is ready for use, the aperture 24 may be closed by means of the rotatable closure member 26 rotatably secured by means of a pin 28 connected to the end plate 22 substantially concentric with the recessed portion 25 to be rotatable therein. The casing 12 is further arranged to receive axially thereof the rotatable input shaft 14. The shaft 14 is journaled in the casing 12 by means of a pair of ball bearings 27 and which bearings are suitably secured to the end faces of the casing 12.

Figure 3:
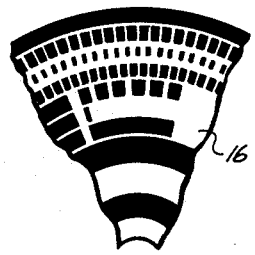
FIG. 3 is an enlarged, fragmentary portion of the coded disc for the encoder of FIG. 1.

The rotatable input shaft 14 is arranged with the coded disc 16 mounted thereon to be rotatable therewith. The disc 16 is mounted on the shaft 14 substantially centrally of the casing 12, as shown in FIG. 1. The disc 16 comprises a plurality of radially spaced tracks made up of conductive and non-conductive segments or positions. These conductive and non-conductive segments may be formed through a photo-etching process to provide a desired binary coded pattern for each track. The binary coding may be a Gray code, a binary coded decimal, or any other well known code. This pattern of conductive and non-conductive segments may be of the same general pattern as shown in FIG. 3. A disc 16 of this type is employed in a presently commercially available encoder and provides on the order of 1000 to 1024 binary bits of information for 360° of rotation of the input shaft and which disc has a diameter of 2.7 inches.

The brush assembly 18 for the encoder 10 comprises a mounting member or brush block 30 for holding the disc sensing elements or brushes 32. The assembly 18 may include brush holders 34 for carrying the brushes 32. The brush block or mounting member 30 may comprise an insulative block constructed of nylon and arranged with a plurality of spaced and aligned sockets 36 defined to slidably receive and hold the brush holders 34. The spacing between the sockets 36 corresponds to the radial spacing of the tracks for the coded disc 16 and which spacing may be on the order of 0.1 inch. The mounting member 30 is further provided with a back portion 30$^a$ coextensive with the mounted brush holders 34. The back portions 30$^a$ are provided with a plurality of spaced adjusting apertures 30$^b$ spaced in alignment with the sockets 36.

The brush holder 34 cooperating with the mounting member 30 is preferably of a shape to be non-rotatable in the sockets 36 for the mounting member 30. This non-rotatable configuration may be a square or rectangular form when the sockets 36 are of a matching configuration. The holders 34 are further arranged to be slidably insertable into the sockets 36 and with the tolerances for the brush holder 34 and the sockets 36 being so related that the brush holder 34 is retained therein without any need for any additional securing means. The brush holder 34 is further defined with an angular slot 34$^a$ to receive the brushes 32 therein; see FIG. 5. The angular slot 34$^a$ is adapted to receive the brush 32 to allow it to angularly extend therefrom into sensing engagement with the coded disc 16. On the opposite side of the brush holder 34 from the slot 34$^a$ there is provided an adjusting notch 34$^b$. The notch 34$^b$ is arranged to receive a sharp pointed adjusting tool therein and is recessed sufficiently to allow the tool to cause the brush holder 34 to slide vertically in its associated socket 36. The brush holder 34 is a conductive member having an axial recess at the bottom end thereof and which recess allows an electrical lead wire such as the lead wire 37 to be connected or soldered thereto.

Figure 5:
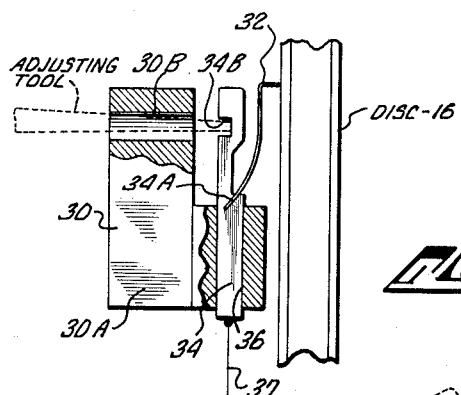
FIG. 5 is a side elevational view, partially in section, of the adjustable brush assembly and showing a fragmentary portion of the disc showing an adjusting tool in dotted outline.
Figure 6:
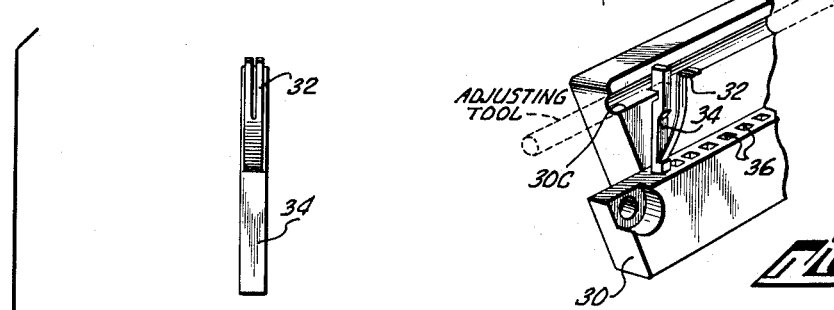
FIG. 6 is a detached view of a modified brush assembly showing a brush adjusting tool in dotted outline.

The sensing element or brush 32 may be in the form of a flat, thin, resilient, conductive element and be so shaped and arranged as to define a curved sensing portion in the same general fashion as a hoe, as seen in FIGS. 5 and 6. This sensing end portion of the brush 32 may be bifurcated and which bifurcation has been found to provide better contact and result in less noise as a result of dirt and dust accumulating on the surface of the disc 16. The opposite end of the brush 32 is insertable in the notch 34$^a$ where it is soldered to the brush holder 34.

Figure 4:
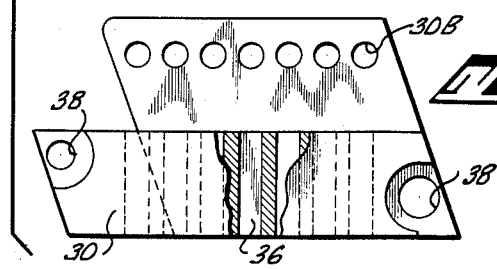
FIG. 4 is an exploded view, partially in section, of a brush holder and a mounting member therefor.

It will now be seen that having mounted the brush 32 on its associated brush holder 34, the latter may be inserted into the sockets 36 for the mounting member 30. The number of brush holders 34 inserted into the mounting member 30 will vary with the particular application and coding of the disc 16. Once this sub-assembly has been arranged in this fashion, the mounting member 30 may then be inserted into the casing 12 and secured to the side walls thereof by the appropriate securing means, the securing means being readily located by the provision of the securing apertures 38 arranged on opposite ends of the member 30; see FIG. 4. It will be appreciated that the brush holder 34 is mounted in the mounting member 30 with the adjusting notch 34$^b$ arranged opposite the apertures 30$^b$ for the mounting member 30. The encoder 10 is shown in FIG. 1 with a brush adjusting assembly 18 engaging opposite sides of the disc 16. The securing of the mounting member 30 in the casing 12 will position each of the brushes 32 in alignment and into sensing engagement with the individual tracks of the disc 16. The lead wire 37 for each of the brushes 32 will be connected internally of the case 12 to an individual electrical connector such as the connector 39 mounted on the side of the case 12. These electrical connectors 39 provide a convenient terminal for the binary coded digital output signals for use in the associated circuitry.

After the above assembly has been completed, it is still necessary, however, to more precisely adjust the brushes 32 relative to the coded segments in order that they may mate therewith and leave the segments correctly. This adjustment is made as a result of the provision of the apertures 30$^b$ and adjusting notches 34$^b$. It merely requires a sharp pointed instrument such as an ice pick to be inserted through the case aperture 24 for the casing 12 and through the apertures 30$^b$ to engage the notches 34$^b$. By positioning the adjusting tool in this fashion the brush holders 34 may be vertically displaced so as to correctly match them with the coded segments of the disc 16 viewed through the case aperture 24. The disc 16 will be seen to be visible through the aperture 24 by an examination of FIG. 2.

Now referring to FIG. 6 wherein a modified brush assembly 18 is shown. This brush assembly is of the same general arrangement as that previously described except that the mounting member 30 is in this instance provided with a longitudinally arranged cylindrical groove positioned opposite the adjusting notches 34$^b$ in place of the apertures 30$^b$. This cylindrical groove 30$^c$ is defined to receive a cylindrical tool having an eccentric point extendable into the adjusting notches 34$^b$, as illustrated. It will be seen from FIG. 1 that access to the adjusting notches 34$^b$, when this type of brush assembly is employed, may be had through the aperture 20 of the casing 12.

It will now be seen that this invention has advanced the state of the encoder art through the provision of an improved, inexpensive, compact brush assembly that may be readily adjusted.

What is claimed is:

1. In an encoder including a rotatably mounted disc having a plurality of radially spaced tracks recorded thereon, an insulative supporting member having a plurality of sockets spaced apart a distance corresponding to the radial spacing of said tracks, a conductive member for each track each having a sensing brush extending therefrom for slidably engaging a separate track and tightly secured by said sockets against lateral displacement or rotation, each of said conductive members having an adjusting notch on a side opposite from the sensing brush, said supporting member being defined with an aperture allowing access to the adjusting notches by means of an adjusting tool and further defining a fulcrum for the adjusting tool for slightly changing the position of a conductive member to allow a sensing brush to correctly follow the individual track on the disc.

2. In an encoder as defined in claim 1 wherein said conductive members are non-rotatable and slidably carried in the sockets for said supporting member and said sensing brushes each comprise a thin, flat, resilient conducting element having a bifurcated sensing end.

3. In an encoder having an apertured case, a shaft rotatably mounted in said case, a disc having a plurality of radially spaced tracks having digitally coded conducting and non-conducting segments, a non-rotatable conductive member having a sensing contact extending therefrom for slidably engaging said segments of a track and an adjusting notch on the opposite side thereof from said sensing contact, an insulative supporting member having a plurality of spaced apart sockets defined to slidably receive one of said conductive members and spaced apart a distance corresponding to the radial spacing of said tracks, one of said conductive members being tightly positioned in each of said plurality of sockets, and means for mounting said supporting member on said case to place the sliding sensing contacts into engagement with the corresponding tracks of said disc and relative to the aperture of said case to allow access to the notches of said conductive members externally of said case, said supporting member is further defined to be coextensive with the conductive members positioned thereon and is provided with a plurality of spaced apart apertures arranged opposite to the notches of said conductive members to receive a tool extending through the aperture of said case into engagement with the adjacent notch of a conductive member whereby the supporting member provides a fulcrum for the tool to allow the movement of said conductive members for tangentially adjusting the sensing contact of the conductive member with the corresponding track of said disc.

4. In an encoder having an apertured case, a shaft rotatably mounted in said case, a disc having a plurality of radially spaced tracks having digitally coded conducting and non-conductive segments, a non-rotatable conductive member having a sensing contact extending therefrom for slidably engaging said segments of a track and an adjusting notch on the opposite side thereof from said sensing contact, an insulative supporting member having a plurality of spaced apart sockets defined to slidably receive one of said conductive members and spaced apart a distance corresponding to the radial spacing of said tracks, one of said conductive members being tightly positioned in each of said plurality of sockets, and means for mounting said supporting member on said case to place the sliding sensing contacts into engagement with the corresponding tracks of said disc and relative to the aperture of said case to allow access to the notches of said conductive members externally of said case, said supporting member is further defined to be coextensive with the conductive members positioned thereon and is provided with a longitudinal groove spaced on said supporting member opposite to the notches of said conductive member to receive a tool extending through the aperture of said case and positioned therein to engage the notch of one of said conductive members whereby the supporting member provides a fulcrum for the tool to allow movement of said conductive members for tangentially adjusting the sensing contact of the conductive member with the corresponding track of said disc.

5. An analog-to-digital converter including a coding element having a plurality of spaced tracks recorded thereon having binary coded segments representative of the same analog value arranged on the tracks to be simultaneously sensed, a supporting member having a plurality of sockets spaced apart a distance corresponding to the spacing of said tracks, a sensing element for each track arranged for separately sensing each track and tightly secured by said sockets against lateral displacement or rotation to allow each sensing element to sense the correct binary segment for the individual track, each of said sensing elements having an adjusting notch on a side opposite from the track exposed side, said supporting member being defined with an aperture allowing access to the adjusting notches of the sensing elements by means of an adjusting tool and further defining a fulcrum for the adjusting tool for slightly changing the position of any one sensing element to position each sensing element to correctly follow the binary segments of the individual track whereby all the segments representative of the same analog value are simultaneously presented to the sensing elements.

6. An analog-to-digital converter as defined in claim 5 wherein the aperture allowing access to the adjusting notches of the sensing elements comprises a plurality of spaced apart apertures arranged opposite to said adjusting notches.

7. An analog-to-digital converter as defined in claim 5 wherein the aperture allowing access to the adjusting notches of the sensing elements comprises a longitudinal groove spaced on said supporting member opposite to said adjusting notches.

References Cited in the file of this patent

UNITED STATES PATENTS

| | | |
|---|---|---|
| 1,844,174 | Munday | Feb. 9, 1932 |
| 2,207,743 | Larson et al. | July 16, 1940 |
| 2,617,907 | Umbarger et al. | Nov. 11, 1952 |
| 2,766,445 | Bland | Oct. 9, 1956 |
| 2,809,369 | Feeney et al. | Oct. 8, 1957 |